United States Patent
Pengilly et al.

(10) Patent No.: US 12,061,461 B2
(45) Date of Patent: Aug. 13, 2024

(54) SYSTEM AND METHOD FOR THE AUTOMATIC SWITCHING OF MULTIPLE VENDOR CONTROLLERS WITH AN INTERFACED INPUT/OUTPUT DEVICE

(71) Applicant: Saudi Arabian Oil Company, Dhahran (SA)

(72) Inventors: Nicholas J. Pengilly, Dhahran (SA); Uduak Daniels, Dhahran (SA); Eyade Housin Subahe, Dhahran (SA); Youshan Ma, Dhahran (SA); Osamah A. Bankhar, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 48 days.

(21) Appl. No.: 17/574,821

(22) Filed: Jan. 13, 2022

(65) Prior Publication Data

US 2023/0221703 A1 Jul. 13, 2023

(51) Int. Cl.
*G05B 19/416* (2006.01)

(52) U.S. Cl.
CPC .. *G05B 19/416* (2013.01); *G05B 2219/37371* (2013.01)

(58) Field of Classification Search
None
See application file for complete search history.

(56) References Cited

U.S. PATENT DOCUMENTS

| | | | |
|---|---|---|---|
| 5,345,378 A | 9/1994 | Lang et al. | |
| 7,085,841 B2 | 8/2006 | Edwards et al. | |
| 9,727,511 B2 | 8/2017 | Markovic et al. | |
| 10,082,786 B2 | 9/2018 | Sait et al. | |
| 11,134,010 B2 | 9/2021 | Mehmedagic et al. | |
| 2017/0357249 A1 | 12/2017 | Sandler et al. | |
| 2018/0046161 A1 | 2/2018 | Yhr | |
| 2019/0199546 A1 | 6/2019 | Ha et al. | |
| 2020/0103865 A1 | 4/2020 | Newton | |
| 2021/0181970 A1* | 6/2021 | Graham | G06F 3/061 |

OTHER PUBLICATIONS

Allen-Bradley; Rockwell Automation; Integrated Power and Automation Reference Manual; https://literature.rockwellautomation.com/idc/groups/literature/documents/rm/3300a-rm001_-en-p.pdf; Oct. 2017; 28 pages.

(Continued)

*Primary Examiner* — Ryan A Jarrett
(74) *Attorney, Agent, or Firm* — Leason Ellis LLP

(57) ABSTRACT

A system and method perform automatic switching of multiple vendor controllers with an interfaced input/output device. The method comprises storing parameters in a memory, wherein the parameters specify each type of instrument controller in a respective one of a plurality of vendor classes, and automatically switching a signal between an instrument and at least one of a first instrument controller of a first vendor class and a second instrument controller of a second vendor class using the parameters, wherein the first vendor class and the second vendor class are different. The system and an automatic input/output switch controller implement the method.

11 Claims, 4 Drawing Sheets

(56) References Cited

OTHER PUBLICATIONS

Bill Lydon; Automation.com; Non-Proprietary Controller-to-Controller Communications; https://www.automation.com/en-us/articles/2014-1/non-proprietary-controller-to-controller-communica; Feb. 7, 2014; 6 pages.

Sait; Academia.edu; Journal of Circuits, Systems, and Computers; Novel Design of Hetrogenious Automation Controller Based On Real-Time Data Distribution Service Middleware To Avoid Obsolescence Achallenges; www.academia.edu/34704329/Novel_Design_Of_Hetroginious_Automation_Controller_Based_On_Real_Time_Data_Distribution_Service_Middleware_To_Avoid_Obsolescence_Challenges; 2016; 28 pages.

Office Action in corresponding Saudi Arabian Application No. 123441027, mailed Nov. 19, 2023; 13 pages.

\* cited by examiner

SYSTEM AND METHOD FOR THE AUTOMATIC SWITCHING OF MULTIPLE VENDOR CONTROLLERS WITH AN INTERFACED INPUT/OUTPUT DEVICE

FIELD OF THE DISCLOSURE

The present disclosure relates generally to switching between instruments and controllers, and, more particularly, to a system and method for the automatic switching of multiple vendor controllers with an interfaced input/output device.

BACKGROUND OF THE DISCLOSURE

Pilot plants and operational process units, for example, as implemented in the gas and oil industry, are typically operated and monitored by a maximum of two controllers at a single time. However, instruments such as pumps and values in these pilot plants and operational process units often can only communicate with one compatible controller at a given time. In addition, such instruments are provided by multiple and different vendors such as different manufacturers. Similarly, controllers from one vendor are also provided by multiple and different vendors, so the incompatibility issue between instruments and controllers is compounded.

One approach to address such incompatibility is to perform a manual switching technique, but such manual switching is both impractical and inefficient due to the huge amount of wiring and the required human operation. A second approach is to utilize an open communication protocol such as the Open Platform Communications (OPC) standard to perform the switching. Such switching is again not practical as the use of open communication protocols do not reflect the actual configuration and operation of the pilot plants and operational process units.

SUMMARY OF THE DISCLOSURE

According to an embodiment consistent with the present disclosure, a system and method perform automatic switching of multiple vendor controllers with an interfaced input/output device.

In an embodiment, a method comprises storing parameters in a memory, wherein the parameters specify each type of instrument controller in a respective one of a plurality of vendor classes. The method also comprises receiving a signal from an instrument, and responsive to receiving the signal, automatically switching the signal between the instrument and at least one of a first instrument controller of a first vendor class and a second instrument controller of a second vendor class using the parameters. The switching includes generating a plurality of copies of the signal, sending a first copy of the signal to the first instrument controller, and sending a second copy of the signal to the second instrument controller. The instrument is selected from the group consisting of: a pressure transmitter, a level transmitter, a liquid flow meter, a gas flow meter, a pressure switch, and a temperature switch. The first vendor class and the second vendor class are different. The switching further includes receiving the signal from the first instrument controller, identifying the instrument corresponding to the first instrument controller according to the first vendor class, and sending the signal to the corresponding identified instrument. The instrument is selected from the group consisting of: a pressure valve, a liquid flow valve, and a gas flow valve. The plurality of vendor classes include at least two vendor classes.

In another embodiment, an automatic input/output switch controller comprises a memory and a processor. The memory is configured to store parameters specifying each type of instrument controller in a respective one of a plurality of vendor classes. The processor including code stored therein configured to receive a signal from an instrument, and to respond to receiving the signal to automatically switch the signal between the instrument and at least one of a first instrument controller of a first vendor class and a second instrument controller of a second vendor class. The switching includes generating a plurality of copies of the signal, sending a first copy of the signal to the first instrument controller, and sending a second copy of the signal to the second instrument controller. The instrument is selected from the group consisting of: a pressure transmitter, a level transmitter, a liquid flow meter, a gas flow meter, a pressure switch, and a temperature switch.

The processor is configured by the code to receive the signal from the first instrument controller, identify the instrument corresponding to the first instrument controller according to the first vendor class, and send the signal to the corresponding identified instrument. The instrument is selected from the group consisting of: a pressure valve, a liquid flow valve, and a gas flow valve. The first vendor class and the second vendor class are different. The plurality of vendor classes include at least two vendor classes.

In a further embodiment, a system comprises an instrument, a plurality of instrument controllers, and a processor. In the plurality of instrument controllers, each type of instrument controller is in a respective one of a plurality of vendor classes. The processor including code stored therein configured to receive a signal from an instrument, and to respond to receiving the signal to automatically switch the signal between the instrument and at least one of a first instrument controller of a first vendor class and a second instrument controller of a second vendor class. The switching includes generating a plurality of copies of the signal, sending a first copy of the signal to the first instrument controller, and sending a second copy of the signal to the second instrument controller. The instrument is selected from the group consisting of: a pressure transmitter, a level transmitter, a liquid flow meter, a gas flow meter, a pressure switch, and a temperature switch.

The processor is configured by the code to receive the signal from the first instrument controller, identify the instrument corresponding to the first instrument controller according to the first vendor class, and send the signal to the corresponding identified instrument. The instrument is selected from the group consisting of: a pressure valve, a liquid flow valve, and a gas flow valve. The first vendor class and the second vendor class are different. The plurality of vendor classes include at least two vendor classes.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system and method for the automatic switching of multiple vendor controllers with an interfaced input/output device.

Figure 1:
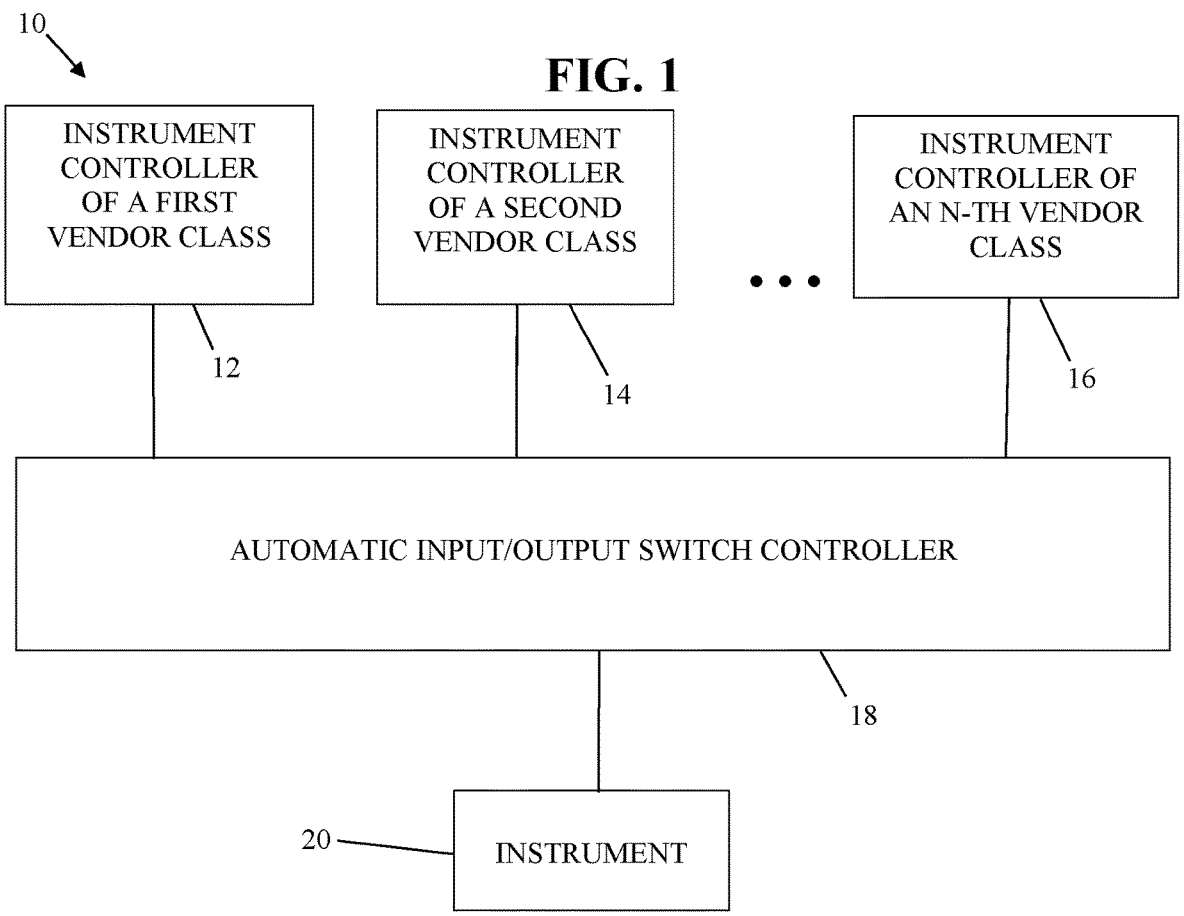
FIG. 1 is a schematic of a system, according to an embodiment.

Referring to FIG. 1, a system 10 includes a plurality of instrument controllers 12, 14, 16, with each instrument controller belonging to a respective vendor class from among N vendor classes, in which N is greater than one. For example, the instrument controllers 12, 14, 16 can be grouped to be in a YOKOGAWA class of instrument controllers, a HONEYWELL class of instrument controllers, an EMERSON class of instrument controllers, a SCHNEIDER class of instrument controllers, a SIEMENS class of instrument controllers, and a JOHNSON CONTROLS class of instrument controllers. Other instrument controllers from different known vendors can also be used.

Each of the instrument controllers 12, 14, 16 can be configured to operate as a distributed control system (DCS), a supervisory control and data acquisition (SCADA) system, a terminal management system (TMS), or a safety instrumented system (SIS), as required in the configuration and operation of the pilot plants and operational process units.

Each of the instrument controllers 12, 14, 16 is connected to an automatic input/output switch controller 18. The automatic input/output switch controller 18 is the interfaced input/output device configured to respond to receiving a signal to switch the signal between at least one instrument 20 and at least one of the instrument controllers 12, 14, 16. As described below, the automatic input/output switch controller 18 performs automatic switching of the signal to ensure that the signal is conveyed between an instrument 20 and a compatible instrument controller from among the plurality of instrument controllers 12, 14, 16, with each instrument controller belonging to a respective vendor class from among the N vendor classes.

Figure 2:
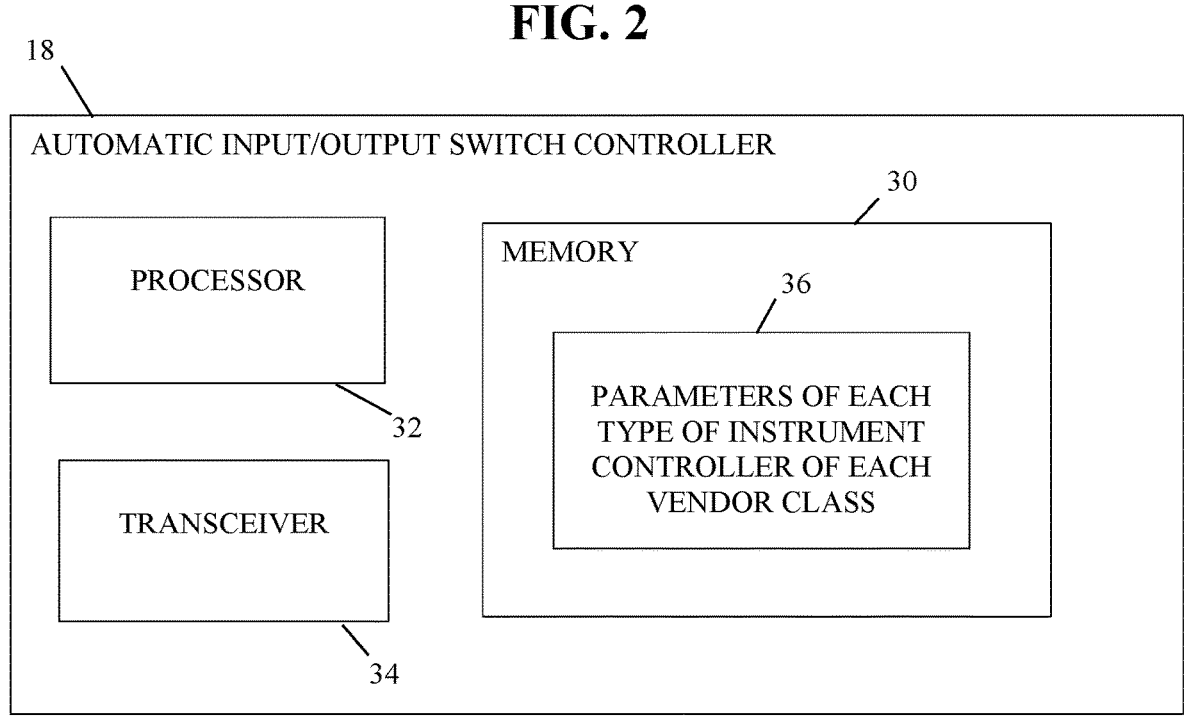
FIG. 2 is a schematic of an automatic input/output switch controller.

Referring to FIG. 2, the automatic input/output switch controller 18 includes a memory 30, a processor 32, and a transceiver 34. The memory 30 is configured to store parameters 36 specifying each type of instrument controller 12, 14, 16 of each of the plurality of vendor classes. The transceiver 34 can be communicatively connected to each instrument controller 12, 14, 16, and to each instrument 20 over an analog channel to transmit or to receive at least one signal. This arrangement is desirable to enable direct communication with legacy control systems such as the types and brands discussed herein. Alternatively, the transceiver 34 can be communicatively connected to each instrument controller 12, 14, 16 and to each instrument 20 over a digital channel. The processor 32 includes code stored therein configured to automatically switch a signal between the instrument 20 and, for example, at least one of a first instrument controller 12 of a first vendor class and a second instrument controller 14 of a second vendor class.

Figure 3:
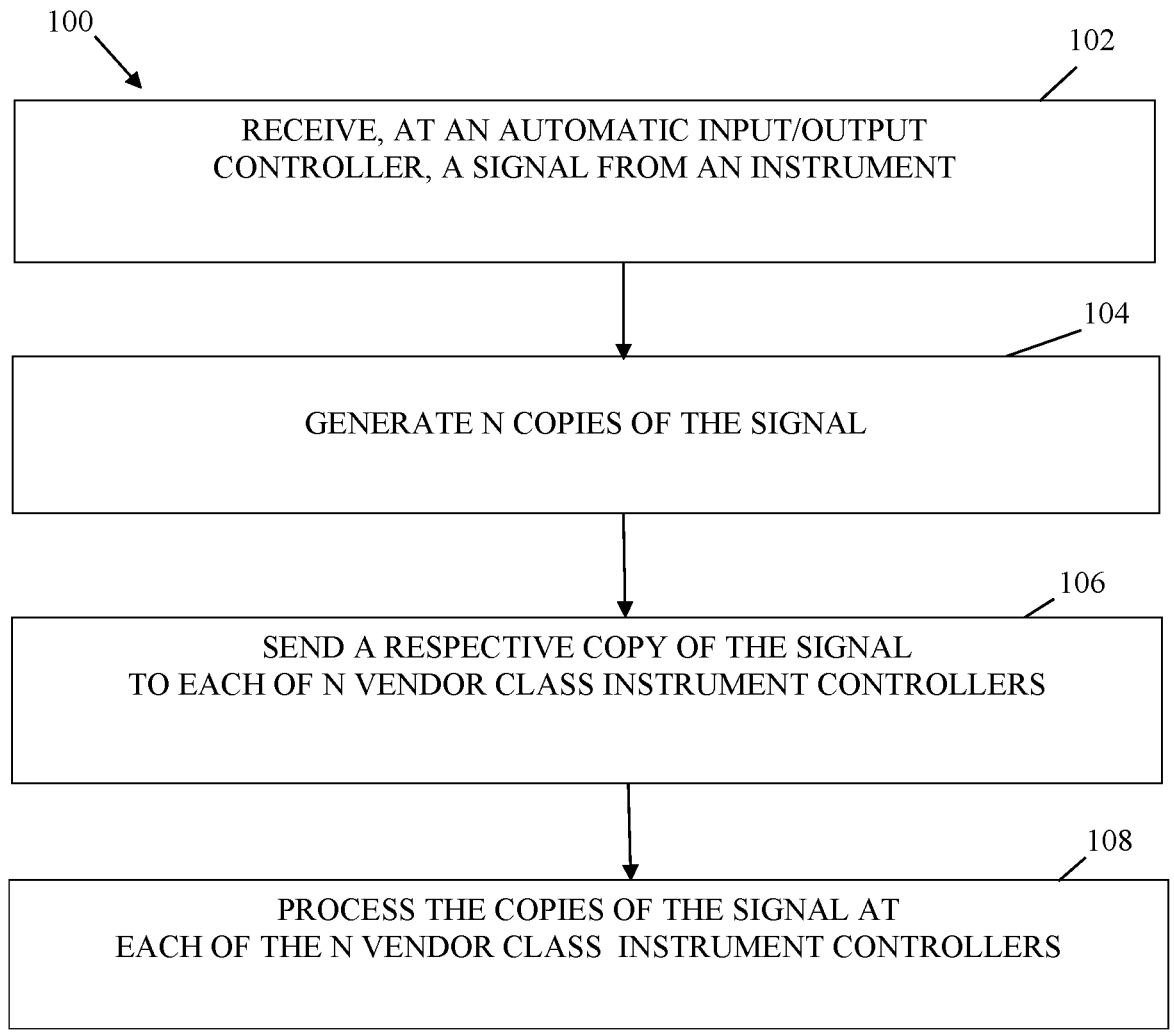
FIG. 3 is a flowchart of the switching of a signal to multiple controllers.

In one embodiment of operation of the system 10, as shown in FIG. 3, a method 100 includes having the processor 32 configured by the code to receive the signal from the instrument 20 in step 102. The signal can be an analog signal transmitted from the instrument 20 to the processor 32 over an analog channel. Alternatively, the signal can be a digital signal transmitted from the instrument 20 to the processor 32 over a digital channel. As noted, by cooperating with analog signals, the switch controller 18 can communicate directly with legacy instruments 20 and instrument controllers. The instrument 20 can be selected from the group consisting of: a pressure transmitter, a level transmitter, a liquid flow meter, a gas flow meter, a pressure switch, and a temperature switch. The method 100 then generates a plurality of copies of the signal in step 104, and sends a respective copy of the signal to each of N vendor class instrument controllers 12, 14, 16 in step 106. For example, the processor 32 sends a first copy of the signal to, for example, the first instrument controller 12, and send a second copy of the signal to, for example, the second instrument controller 14. The first and second copies of the signal can be an analog signal transmitted from the processor 32 over an analog channel. Alternatively, the signal can be a digital signal transmitted from the processor 32 to the processor 32 over a digital channel. The method 100 then processes the copies of the signal at each of the N vendor class instrument controllers 12, 14, 16 in step 108.

For example, with the instrument 20 embodied as a pressure transmitter, such as a 4-20 mA pressure transmitter. The pressure transmitter can measure a pressure value in a plant, such as a pipe in the plant. The pressure value is then sent from the instrument 20 as the signal which is copied, sent to the N vendor class instrument controllers 12, 14, 16, and processed by at least one of such instrument controllers 12, 14, 16. For example, the pressure value can be processed by an i'th instrument controller from among the N vendor class instrument controllers 12, 14, 16. The i'th instrument controller can respond to the signal to control other equipment or instruments, such as a shut-off valve for the pipe.

Figure 4:
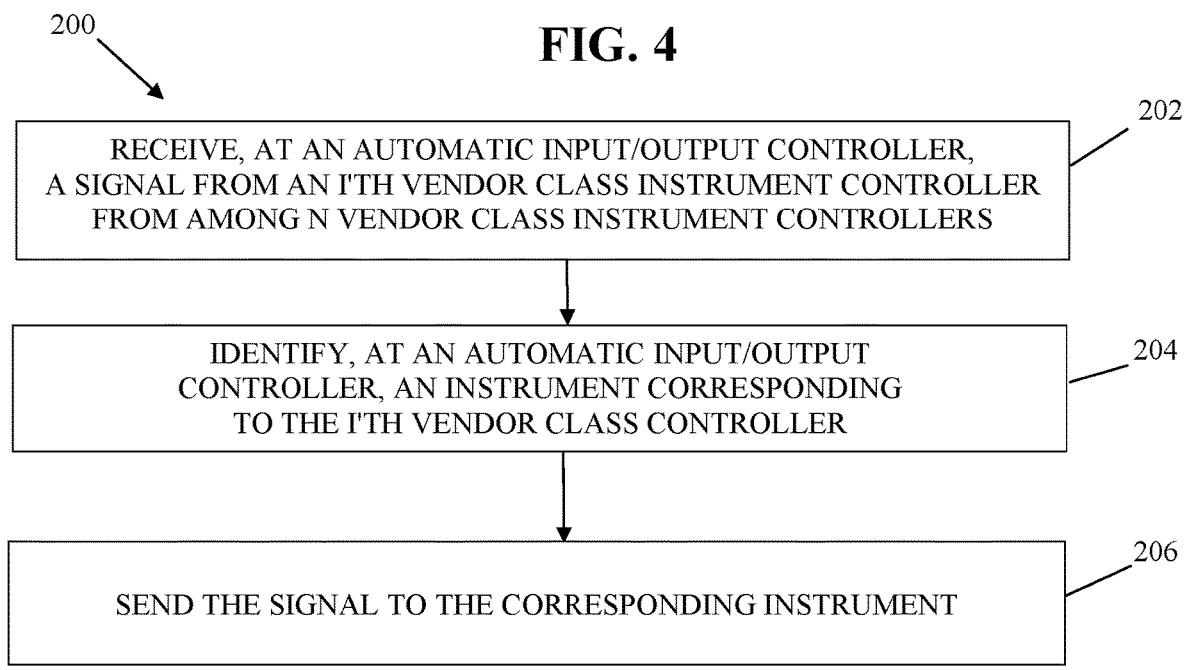
FIG. 4 is a flowchart of the switching of a signal to an instrument.

In another embodiment of operation of the system 10, as shown in FIG. 4, a method 200, includes the processor 32, configured by the code, receiving the signal from, for example, an i'th instrument controller from among the N vendor class instrument controllers in step 202. The signal can be an analog signal transmitted from the i'th instrument controller to the processor 32 over an analog channel. Alternatively, the signal can be a digital signal transmitted from the i'th instrument controller to the processor 32 over a digital channel. The method 200 then identifies the instrument 20 corresponding to the i'th instrument controller according to the i'th vendor class in step 204. The method 200 then sends the signal to the corresponding identified instrument 20. The signal sent to the corresponding identified instrument 20 can be an analog signal transmitted over an analog channel. Alternatively, the signal sent to the corresponding identified instrument 20 can be a digital signal transmitted over a digital signal. The instrument 20 can be selected from the group consisting of: a pressure valve, a liquid flow valve, and a gas flow valve. For example, a first instrument controller 12 of the first vendor class can send the signal to the automatic input/output controller 18. In turn, the automatic input/output controller 18 identifies the instrument 20 to correspond to the first vendor class controller. The identified instrument 20 can be a pressure valve, such as a 4-20 mA control loop valve. In response to receiving the signal at the pressure valve, for example, the pressure valve can be actuated to shut off a pipe of the plant.

As described herein, the instrument 20 can be any type of known instrument, such as electrical instrumentation configured to measure temperature, pressure, flow, weight, level, etc., and using different and known industrial control system protocols. For example, the industrial control system protocols can include 4-20 mA, HART, Modbus (RTU and TCP/IP) Ethernet and Serial, OPC (DA, HDA and UA), DNP 3.0, Foundation Fieldbus, Wi-HART, and ISA 100 Wireless.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including." "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including." "comprising." "having." "containing." "involving." and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method, comprising:
providing an automatic input/output controller;
providing a plurality of instruments, including a first instrument and at least one second instrument, operatively connected to the automatic input/output controller;
providing N instrument controllers, including a first instrument controller and a second instrument controller, operatively connected to the automatic input/output controller, where N is greater than 1;
storing parameters in a memory, wherein the parameters specify each type of the N instrument controllers in a respective one of N vendor classes;
receiving a signal from the first instrument; and
responsive to receiving the signal, automatically switching the signal between the first instrument and at least one of the first instrument controller of a first vendor class and the second instrument controller of a second vendor class using the parameters, wherein the switching includes:
generating N copies of the signal;
sending each of the N copies to a respective one of the N instrument controllers;
sending an iTH copy among the N copies from an iTH instrument controller to the automatic input/output controller;
receiving the iTH copy at the automatic input/output controller;
identifying one instrument of the least one second instrument, wherein the identified instrument corresponds to the iTH instrument controller; and
sending the iTH copy of the signal to the identified instrument corresponding to the iTH instrument controller;
wherein the first instrument is selected from the group consisting of: a pressure transmitter, a level transmitter, a liquid flow meter, a gas flow meter, a pressure switch, and a temperature switch, and
wherein the first vendor class and the second vendor class are different.

2. The method of claim 1, wherein the identified instrument is selected from the group consisting of: a pressure valve, a liquid flow valve, and a gas flow valve.

3. The method of claim 1, wherein the plurality of vendor classes include at least two vendor classes.

4. An automatic input/output switch controller operatively connected to a plurality of instruments including a first instrument and a second instrument, and operatively connected to N instrument controllers, including a first instrument controller and a second instrument controller, where N is greater than 1, comprising:

a memory configured to store parameters specifying each type of the N instrument controllers in a respective one of N vendor classes; and a processor including code stored therein configured to receive a signal from the first instrument, and to respond to receiving the signal to automatically switch the signal between the first instrument and at least one of the first instrument controller of a first vendor class and the second instrument controller of a second vendor class, wherein the switching includes:

generating N copies of the signal, sending each of the N copies to a respective one of the N instrument controllers, receiving an iTH copy among the N copies from an iTH instrument controller, identifying one instrument of the least one second instrument, wherein the identified instrument corresponds to the iTH instrument controller, and sending the iTH copy of the signal to the identified instrument corresponding to the iTH instrument controller, wherein the first instrument is selected from the group consisting of: a pressure transmitter, a level transmitter, a liquid flow meter, a gas flow meter, a pressure switch, and a temperature switch, and wherein the plurality of instruments includes at least one second instrument.

5. The automatic input/output switch controller of claim 4, wherein the identified instrument is selected from the group consisting of: a pressure valve, a liquid flow valve, and a gas flow valve.

6. The automatic input/output switch controller of claim 4, wherein the first vendor class and the second vendor class are different.

7. The automatic input/output switch controller of claim 4, wherein the plurality of vendor classes include at least two vendor classes.

8. A system, comprising:
a plurality of instruments including a first instrument and at least one second instrument;

N instrument controllers including a first instrument controller and a second instrument controller, where N is greater than 1, with each type of the N instrument controllers being in a respective one of N vendor classes; and an automatic input/output controller, operatively connected to the plurality of instruments and to the N instrument controllers, and comprising a processor including code stored therein configured to receive a signal from the first instrument, and to respond to receiving the signal to automatically switch the signal between the first instrument and at least one of the first instrument controller of a first vendor class and a second instrument controller of a second vendor class, wherein the switching includes:

generating N copies of the signal, sending each of the N copies to a respective one of the N instrument controllers, sending an iTH copy among the N copies from an iTH instrument controller to the automatic input/output controller, receiving the iTH copy at the automatic input/output controller, identifying one instrument of the least one second instrument, wherein the identified instrument corresponds to the iTH instrument controller, and sending the iTH copy of the signal to the identified instrument corresponding to the iTH instrument controller, wherein the first instrument is selected from the group consisting of: a pressure transmitter, a level transmitter, a liquid flow meter, a gas flow meter, a pressure switch, and a temperature switch.

9. The system of claim 8, wherein the identified instrument is selected from the group consisting of: a pressure valve, a liquid flow valve, and a gas flow valve.

10. The system of claim 8, wherein the first vendor class and the second vendor class are different.

11. The system of claim 8, wherein the plurality of vendor classes include at least two vendor classes.

* * * * *